(12) United States Patent
Blasi

(10) Patent No.: US 8,583,547 B2
(45) Date of Patent: Nov. 12, 2013

(54) PRECIOUS METAL FINANCIAL INSTRUMENT

(76) Inventor: Christopher L. Blasi, Flanders, NJ (US)

( * ) Notice: Subject to any disclaimer, the term of this patent is extended or adjusted under 35 U.S.C. 154(b) by 0 days.

(21) Appl. No.: 13/065,276

(22) Filed: Mar. 18, 2011

(65) Prior Publication Data

US 2011/0258102 A1    Oct. 20, 2011

Related U.S. Application Data

(60) Provisional application No. 61/342,767, filed on Apr. 20, 2010.

(51) Int. Cl.
*G06Q 40/00* (2012.01)
(52) U.S. Cl.
USPC .............................................. 705/39; 705/35
(58) Field of Classification Search
USPC ...................................... 705/39, 35
See application file for complete search history.

(56) References Cited

U.S. PATENT DOCUMENTS

| | | | | |
|---|---|---|---|---|
| 2002/0087428 A1* | 7/2002 | Koide et al. | ..................... | 705/26 |
| 2009/0119200 A1* | 5/2009 | Riviere | ........................... | 705/37 |

OTHER PUBLICATIONS

The Federal Register; "Self-Regulatory Organizations; NYSE Arca, Inc.; Notice of Filing of Proposed Rule Change . . ."; FIND; Nov. 17, 2009.*
Anonymous; "Organisation and regulation of securities markets"; Financial Market Trends; Feb. 1993.*

* cited by examiner

*Primary Examiner* — Edward Chang
(74) *Attorney, Agent, or Firm* — Paul E Schaafsma; NovusIP, LLC

(57) ABSTRACT

In accordance with the principles of the present invention, a computer-implemented precious metals investment product and process for pricing a precious metals composite product are provided. A measured unit of trade is established. The measured unit of trade comprises a plurality of precious metal components. The measured unit of trade is quoted and traded as a unit, thus allowing for uniformity in the ongoing offers to buy and sell a fixed quantity, or multiples of this fixed quantity, and pricing consistency for the metals. The precious metals components are backed by physical precious metals. The precious metals components are electronically tracked and priced in live market prices. Live pricing of the precious metals composite product is provided utilizing the live pricing of the precious metal components. An investor retains the option to take delivery of their precious metals or to liquidate by a plurality of methods.

14 Claims, 2 Drawing Sheets

PRECIOUS METAL FINANCIAL INSTRUMENT

RELATED APPLICATION

This application is based on U.S. Provisional Patent Application No. 61/342,767 titled, "Precious Metals Composite Ounce (PMC Ounce)" filed on 20 Apr. 2010.

FIELD OF THE INVENTION

The present invention relates to computer-implemented investment products, and more particularly to a computer-implemented investment vehicle that offers diversification of an investment position in physical precious metals.

BACKGROUND OF THE INVENTION

A precious metal is a rare, naturally occurring metallic chemical element of high economic value. Historically, precious metals were important as currency, but are now regarded mainly as investment and industrial commodities. The demand for precious metals is driven not only by their practical use, but also by their role as investments and a store of value. Historically, precious metals have commanded much higher prices than common industrial metals. While not limiting the present invention, the four major precious metals, as generally understood in the global market, are gold, silver, platinum, and palladium; three of these metals serve as the primary investible assets for investors wanting to buy/sell precious metals: gold, silver, and platinum.

Precious metals have historically served as a recommended component within a diversified investment portfolio. These physical assets are associated as a store of wealth; inflation and currency hedge; and for art, jewelry manufacturing and industrial use. Precious metals are an internationally traded commodity, and trading in precious metals has existed globally for thousands of years. Currently, there are international exchanges that exist to facilitate a mechanism for price discovery and trade in precious metals. The major trading centers for the precious metals are the Hong Kong Mercantile Exchange, the Dubai Gold & Commodities Exchange, the London Metal Exchange, and the COMEX division of the New York Mercantile Exchange.

One unique characteristic of physical precious metals investing is that the owner of such metals is capable of realistically having direct ownership of the investment. This is typically not the case for other major commodity investments, such as oil, wheat, pork bellies, etc. However, even though an individual investor could take possession of the physical precious metals, there are still custody, storage, and security elements associated with possession of precious metals.

Many of the financial instruments created over the last several decades were centered on equities and fixed income instruments. One large segment of advanced financial products centered on providing investors instant and easy diversification within a particular asset class. These products would have a regularly published trading price that provided the investor an easy way to track and trade their investment. Such products flourished in various forms, such as for example equity mutual funds, fixed income mutual funds, Real Estate Investment Trusts (REITs), etc.

Likewise, there have been attempts to develop a number of direct and indirect vehicles for investors to participate in the precious metals markets. The following are the most widely used methods for investing in precious metals for both institutional and individual investors; however, each suffers from significant drawbacks.

Direct ownership of physical precious metals is straightforward, as the investor is directly purchasing and therefore gains title to the metal. Advantages are full and unencumbered ownership, the elimination of counterparty risk, portability of the asset, liquidity, global acceptance of the asset, and direct price discovery. Drawbacks include varying premium costs over spot prices for retail investors, depending on what form in which the precious metal is fabricated; custody arrangements; storage costs; theft protection; and, for investors who have taken personal possession of the items (removed the precious metals from a dealer storage account), getting the items back into the market for sale and/or trade. Also, taking physical delivery of certain precious metal bars, thus removing them from a recognized and exchange-approved depository, breaks the chain of custody. Breaking the change of custody may require the owner to pay for an assay of the metals if and when they sell the metals and subsequently must return them to a depository.

Another vehicle is pool accounts. A pool account is, in effect, a precious metal account in which a client owns a defined, un-segmented interest or portion in a pool of precious metal held in storage at the dealer's facility. The precious metals dealer takes funds from the investor and owes the investor a quantity of metal equal to the amount originally purchased. The dealer is not compelled to, and in most cases does not, purchase the metal to secure the customer's purchase. Because this is basically a loan to a dealer, with a promise to repay based on the value of the metal at time of redemption, the premium the dealer charges over the spot price of the metal is very low, but the investor is taking on a lot of risk. Since the customer gains no title to any precious metals as security for the invested funds, should the dealer become insolvent, the investor is viewed simply as a creditor.

Shares in mining concerns are widely used by investors as a proxy play on the precious metals market. Advantages are that the shares are quoted and traded on major equity exchanges. Disadvantages include mining shares are not a direct investment into precious metals, the shares do not move in value in direct proportion to changes in the pricing of precious metals, and mining shares carry the counterparty risks associated with an operating company. Additionally, share prices can be affected by market conditions which are not indicative of the operational condition of the company.

Exchange Traded Funds (ETF's) and Exchange Traded Products (ETP's) are investment funds traded on exchanges, much like stocks. With the precious metals ETF's/ETP's a trust is created that issues shares representing ownership interest in the trust. The stated objective of the trust is to track the price of the underlying metal. The investor does not have direct ownership of the underlying metal. As to the holdings of the trust, metal is reported to be held in both allocated and unallocated accounts. The investor is charged a quarterly management fee to cover administrative and storage costs. The primary allure of these funds are ease of trade, and the ability to trade fractional increments of the metal, as the shares are generally priced to represent a fraction of an ounce (for example, gold is generally quoted and purchased in ounces; the shares of the SPYDR Gold Trust ETF (GLD) offered by State Street Global Markets, LLC, One Lincoln Street, Floor 30, Boston, Mass. 02111 represent $\frac{1}{10}$th of an ounce).

Drawbacks associated with most such trust vehicles include those associated with general counterparty risk when an entity and financial instrument is placed between an investor and the underlying asset. Such risks include the trust's lack of control at their custodians and sub-custodians, elevated risk compared to metal held in an allocated account, elevated risk to any portion of the trust's holding which are in unallocated accounts, and failure of the fund or trust managers to execute their fiduciaries duties. Additionally, the typical retail or small institutional investor is not provided with the ability to convert, in a reasonable and efficient way, the purchased shares into actual physical metals for delivery.

For example, among the risks associated with the SPYDR Gold Trust ETF (GLD) discussed in its Prospectus (available at http://www.spdrgoldshares.com/media/GLD/file/SPDRGoldTrustProspectus.pdf (accessed 15 Mar. 2011)) are the following:

"The Shares may trade at a price which is at, above or below the NAV [Net Asset Value] per Share and any discount or premium in the trading price relative to the NAV per Share may widen as a result of non-concurrent trading hours between the COMEX division of the New York Mercantile Exchange, or the COMEX, and the NYSE Arca."

"The sale of gold by the Trust to pay expenses will reduce the amount of gold represented by each Share on an ongoing basis irrespective of whether the trading price of the Shares rises or falls in response to changes in the price of gold."

"The sale of the Trust's gold to pay expenses at a time of low gold prices could adversely affect the value of the Shares."

"Purchasing activity in the gold market associated with the delivery of gold bullion to the Trust in exchange for Baskets may cause a temporary increase in the price of gold. This increase may adversely affect an investment in the Shares."

"Shareholders do not have the protections associated with ownership of shares in an investment company registered under the Investment Company Act of 1940 or the protections afforded by the CEA [Commodities Exchange Act]."

"The Trust may be required to terminate and liquidate at a time that is disadvantageous to Shareholders."

"Redemption orders are subject to postponement, suspension or rejection by the Trustee under certain circumstances."

"Redemption orders are subject to postponement, suspension or rejection by the Trustee under certain circumstances."

"Shareholders do not have the rights enjoyed by investors in certain other vehicles."

"When the seven year fee reduction period terminates or expires, the estimated ordinary expenses payable by the Trust may increase, thus reducing the [net asset value] of the Trust more rapidly and adversely affecting an investment in the Shares."

"[T]he Trustee may have no right to visit the premises of any subcustodian for the purposes of examining the Trust's gold bars or any records maintained by the subcustodian, and no subcustodian will be obligated to cooperate in any review the Trustee may wish to conduct of the facilities, procedures, records or creditworthiness of such subcustodian."

"In issuing Baskets, the Trustee relies on certain information received from the Custodian which is subject to confirmation after the Trustee has relied on the information. If such information turns out to be incorrect, Baskets may be issued in exchange for an amount of gold which is more or less than the amount of gold which is required to be deposited with the Trust."

"The Trust's obligation to reimburse the Marketing Agent, the Authorized Participants and certain parties connected with its initial public offering of 2,300,000 Shares for certain liabilities in the event the Sponsor fails to indemnify such parties could adversely affect an investment in the Shares."

"Gold held in the Trust's unallocated gold account and any Authorized Participant's unallocated gold account will not be segregated from the Custodian's assets. If the Custodian becomes insolvent, its assets may not be adequate to satisfy a claim by the Trust or any Authorized Participant."

In addition, in existing offerings a customer can purchase amounts of a precious metal in quantities that are not priced in round ounces or equal to the amount of an available fabricated quantity, such as a kilo bar, 100 oz bar, etc. These types of offerings are specific to one metal and are most similar to a precious metal purchase that generates a warehouse receipt. A warehouse receipt represents direct ownership of a quantity of the purchased metal. The purchase may be secured by a percentage ownership of a larger bar. Such offerings are made available by firms such as GoldMoney Inc., and have been made available by Neptune Global Holdings LLC, Wilmington, Del. 19801 since 2004.

An expanded description of such an offering from Neptune is as follows (available at http://www.neptuneglobal.com/files/Vault_Account_Info_Oct2010v2.pdf (accessed 15 Mar. 2011)): "Vault Account is an account whereby clients own a defined quantity of a precious metal(s). The precious metal(s) representing the holdings of Vault Account clients are consolidated and stored in Neptune's master allocated account at a recognized bullion depository. Client holdings (a defined quantity) are secured by precious metals, but not to a specific bar(s) and/or coin(s). The client has the option to convert Vault Account holdings into bullion for delivery in the form of any type bar or coin normally carried by Neptune upon payment of quoted fabrication charges."

It would therefore be beneficial to an investor, to offer an investment product that marries the benefits of direct ownership of physical precious metals, a more efficient and democratic delivery option of the investment for small investors, the elimination of a 'paper' proxy substituting as direct ownership, the elimination of a third-party trust entity for the ownership and associated management of the metal between the investor and the underlying metal, and an efficient diversification characteristic affording ease of trade and real-time pricing capabilities. Such an investment product should further provide ease of trade, real time price quoting, and a degree of investment diversification within the precious metals spectrum.

SUMMARY OF THE INVENTION

In accordance with the principles of the present invention, a precious metals investment product is provided that marries the benefits of direct ownership of physical precious metals, provides a more efficient and democratic delivery option of the investment for small investors, eliminates a third party trust entity for the ownership and associated management of the metal between the investor and the underlying metal, and provides an efficient diversification characteristic affording ease of trade and real time pricing capabilities.

In accordance with the principles of the present invention, a computer-implemented precious metals investment product and process for pricing a precious metals composite product are provided. A measured unit of trade is established. The measured unit of trade comprises a plurality of precious metal components. The measured unit of trade is quoted and traded as a unit, thus allowing for uniformity in the ongoing offers to buy and sell a fixed quantity, or multiples of this fixed quantity, and pricing consistency for the metals. The precious metals components are backed by physical precious metals. The precious metals components are electronically tracked and priced in live market prices. Live pricing of the precious metals composite product is provided utilizing the live pricing of the precious metal components. An investor retains the option to take delivery of their precious metals or to liquidate by a plurality of methods.

DETAILED DESCRIPTION OF A PREFERRED EMBODIMENT

Figure 1:
FIG. 1 is a pie-chart of a first example precious metals investment product in accordance with the principles of the present invention.

A precious metals investment product in accordance with the principals of the present invention amalgamates the benefits of the physical precious metals ownership with those of typical products offered by investment companies that tout a single vehicle that facilitates easy ownership and a level of diversification. A precious metals investment product in accordance with the principals of the present invention provides investors with the benefits of physical precious metals ownership, of which there are numerous in comparison to mining shares, futures contracts, trusts, etc., while delivering the physical precious metals in a 'productized' package. A precious metals investment product in accordance with the principals of the present invention marries the benefits of direct ownership of physical precious metals, delivery option of the investment, no 'paper' proxies to precious metals ownership, etc., with instant diversification across the precious metals spectrum. This diversification is important because the precious metals (such as, for example, gold, silver, platinum, and palladium) do not perform in unison; each metal is recognized in the market place as have varying degrees of their market value determined for their properties as a store of wealth or industrial component.

Further, a precious metals investment product in accordance with the principals of the present invention is tracked and priced in live market prices, giving the investor the ability to product price and order execute based on current market prices and track the value of their holdings 'real time'. This is a benefit over prior art products offering diversification, such as mutual funds, as a precious metals investment product of the present invention can be bought or sold in the course of the day as opposed to an end of day trade as in a mutual fund (calculate the net asset value after the close). Further, additional embodiments in accordance with the principals of the present invention can be offered with a modification which allows for specific time periods to serve as investor entry and exit points for trade. Such points may establish investor purchase and liquidation pricing based on the closing prices within a trade day for the precious metals on the London Bullion Market Exchange or the New York Mercantile Exchange (Comex).

A precious metals investment product in accordance with the principals of the present invention offers an efficient way for investors to diversify their investment in physical precious metals. A precious metals investment product of the present invention is backed by physical precious metals stored in an insured depository. With a precious metals investment product of the present invention, investors continue to retain the option to take delivery of their precious metals.

There is growing concern in the investment community that the 'fractional reserve' method of selling a greater number of futures contracts then gold/silver held in their warehouses will ultimately lead to a default in the futures contracts they sell. The nature of the present invention, with physical precious metals being purchased by the investor, removes this element of risk to the investor. Thus, the present invention provides protection from the risk associated with the issues of 'paper' gold and silver (such as the COMEX futures exchange) from default through their inability to make delivery.

Precious metals are valued in the market differently. Their specific changes in market value are based on their unique characteristics and how market conditions affect each one. Because changes in value for precious metals do not move in lockstep with each other, each precious metal is positioned to offer greater potential upside or downside price movements from time to time based on market conditions for each. As such, the allocation of an investor's funds across several of the precious metals would provide the benefits generally associated with investment diversification. The present invention provides the benefit of diversification within the asset class referred to as 'precious metals' in conjunction with the benefits generally associated with direct ownership of physical precious metals.

A precious metals investment product in accordance with the principals of the present invention is not a fabricated 'bullion round' or coin, but a measured unit of trade backed by the physical precious metals it represents. A precious metals investment product of the present invention is quoted and traded as a unit, thus allowing for uniformity in the ongoing offers to buy and sell a fixed quantity, or multiples of this fixed quantity, and pricing consistency for the metals. The holding of the client's precious metals that comprise the aggregate total of precious metals investment product of the present invention owned can be within a recognized bullion depository.

The physical metal holdings that secure the holdings of the purchasers of the precious metals investment product of the present invention can be stored in a depository or depositories in an allocated account or accounts. Within the allocated account are the aggregate holdings of the purchasers of the precious metals investment product. Client holdings within the allocated accounts can be commingled; such commingling of metals is not of any detriment to the valuation of the client holdings as the precious metals are considered fungible assets.

In one exemplary embodiment of the present invention, this diversified 'unit' can be a standard unit of measurement in the precious metals market. In a further exemplary embodiment of the present invention, this standard unit of measurement in the precious metals market can be an 'ounce'. In one exemplary embodiment of the present invention, this theoretical ounce can be comprised of fractional amounts of the three primary precious metals (gold, silver, platinum) that roll up to a full ounce. In alternative embodiments of the present invention, alternative metals can be substituted for one or all of the metals that comprise the ounce, additional metal(s) can be added to the ounce, the number of metals can be reduced, different metal combinations can be utilized and/or different fractions of an ounce can be utilized.

The theoretical ounce comprised of three fractional amounts for gold, silver and platinum allows for a precious metals investment product of the present invention to be priced in real time as it is a consolidation of three live electronic price feeds from the market. The ounce(s) purchased and held for the investor equate directly to an allocated amount of the specific precious metals that comprise the aggregate of the total investment.

Figure 2:
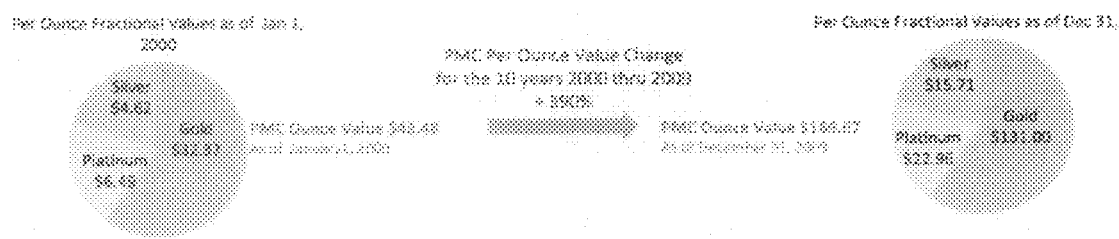
FIG. 2 is a flow-chart showing the appreciation of the example precious metals investment product of FIG. 1.

Referring now to FIGS. 1 and 2, a non-limiting example composition of a precious metals investment product in accordance with the principals of the present invention is depicted, which can be referred to as a 'precious metals composite ounce'. Referring to FIG. 1, the precious metals composite ounce of FIGS. 1 and 2 is comprised of 1.5% platinum, 11.5% gold, and 87% silver. As compared to silver, gold constitutes a smaller volume percentage of the example precious metals composite ounce, but the greater market value of gold makes it a larger value component of the investment. Referring to FIG. 2, an example of how the example precious metals composite ounce reflects market price changes for each of the precious metals that comprise the example precious metals composite ounce is seen. The per ounce fractional values as of 1 Jan. 2000 would have been silver $4.62; platinum $6.49; and gold $32.37: the value of the example precious metals composite ounce as of 1 Jan. 2000 would have been $43.48. The per ounce fractional values as of 31 Dec. 2009 would have been silver $15.71; platinum $22.96; and gold $131.00: the value of the example precious metals composite ounce as of 31 Dec. 2009 would have been $169.67. Thus, the return for the example precious metals composite ounce for the 10 years 2000 through 2009 would have been +390%. Of course, the calculations for the price offered to 'sell to' and 'buy from' the investor can be modified as to premiums and discounts added. In addition, the fractional composition of each of the metals that make up the precious metals composite ounce can be adjusted and made available in separate offerings to investors as a means of creating varying portfolio allocations.

Thus, a precious metals investment product in accordance with the principals of the present invention provides investors with the ability to purchase precious metals at a low premium over the spot price as compared to purchasing precious metals outside the invention. The pricing advantage for the investor is achieved because the dealer is securing the investment into the present invention with large amounts of the individual precious metals. The per ounce price for large bars (generally a form of precious metals purchased by institutional investors) is generally available at a lower premium over the spot price for the metals in comparison to the typical forms of precious metals purchased by individual investors.

At some point after the purchase of a precious metals investment product of the present invention, the investor may wish to liquidate their investment. The first option would be to sell the holdings at the than quoted buy back price and receive the funds from the sale. In addition, the present invention can allow for the option for the investor to take delivery of the metals owned. This could be the delivery of all the metals or just one or two of the metals for delivery and the others liquidated for cash. Fractional ounces could not be delivered to the investor and would be liquidated for cash. The investor could request delivery in various forms of the metal from the same type metal and pay the associated fabrication charges and shipping fees.

The composition of a precious metals investment product of the present invention can be adjusted to achieve various portfolio objectives. At the time of purchase, an investor can determine the construct of the precious metals investment product. Each new configuration can be offered as a separate and distinct offering. This is because to properly price a precious metals investment product of the present invention after the sale of a version of the present invention, the allocated amount of each metal remains consistent. The advantages of having the flexibility to have various offered configurations of a precious metals investment product of the present invention include the ability to offer various configurations based on investment objectives as they relate to the investor's outlook for the performance of the individual metals and to allow a precious metals investment product of the present invention to be offered by various dealers or brokers and provide the dealers and brokers with the opportunity to configure the offering in a way that is unique to their firm.

The following describes non-limiting examples of a computer-implemented process for pricing a second example precious metals composite product in accordance with the principles of the present invention. At the time of purchase, a standardized precious metals composite ounce can be offered or an investor can determine the construct of the precious metals composite ounce. The options include which precious metals are represented by the ounce and the percentage of the ounce allocated to each component. The offeror can maintain the operations for the computer-implemented investment vehicle, determining the buy/sell price for the precious metals composite ounce. The buy/sell prices will be based on the market prices for the precious metal components and any reasonable and customary premiums, mark-ups, and/or discounts to each component.

For example, say an investor holds 544 ounces of a non-limiting precious metals investment product of the present invention which breaks down as:

| | |
|---|---|
| Gold | 62.6415 oz's |
| Silver | 473.8966 oz's |
| Platinum | 8.1706 oz's |

The investor decides to liquidate the precious metals investment product of the present invention and opts to take cash for the liquidation of the silver and platinum, but takes delivery of the gold. The gold is secured by two gold kilo bars (each kilo bar equals 32.15 ounces); therefore, the investor owns one kilo bar and 30.4915 ounces of the other kilo bar. Some of the options for the investor would be: take delivery of one kilo bar, 30 1 oz bullion coins, and the remainder in cash. In this option, there would be a fee for the conversion to the bullion coins since bullion coins have a higher premium on them than kilo bars. In another option, the investor could take delivery of 62 bullion coins (pay fabrication premium per coin) and take remaining fractional ownership in cash. In another option, the investor takes delivery of six 10 oz gold bullion bars and takes the remaining 2.6415 ounces in cash. Of course, other option combinations would be available.

In another example of the same investor closing the account would be the investor liquidates the gold and platinum holdings for cash. At the time of liquidation, the buy-back pricing for gold is $1,265.50 per ounce and platinum is $1670.40 per ounce. The investor also chooses to take delivery of as many 100 ounce silver bars as possible based on the accounts silver holdings. The silver buy-back price is $26.50 per ounce, and the purchase price of a 100 ounce silver bar is $2,700.00 ($27.00 per ounce) plus shipping. Per the investor's choice, at closing the investor can: receive $79,272.81 for the liquidation of the gold holdings; receive $13,648.17 for the liquidation of the platinum holdings; four (4) 100 oz silver bars are shipped and the investor receives $1,758.26 from the sale of the remaining silver ounces (less shipping costs of the silver bars).

The premiums added to each of the metals in the precious metals investment product of the present invention can be adjusted to the dealer's desired profit margin. Commissions and other input variables can be calculated in with live price updates. This allows for product pricing flexibility.

Referring to the following Tables, an example computer-implemented pricing process for a precious metals investment ounce of the present invention is seen. Table 1 shows a calculation for a client purchase of a bullion complex per ounce price. In Table 1, the spot ask prices per ounce are provided as a data feed from a precious metal exchange (Gold is designated by Au; silver by Ag; platinum by Pt). The purchase premium, unit percentage, and MAF dollars at 2.00% are dealer applied variables The "Ounce [oz] Complex Metal Component" is a description of the particular metal in this example of the precious metals composite ounce. The "Spot Ask Price [Px] per Ounce [oz]" is the market spot ask price that is received via a feed from an exchange and is to be used as the basis for pricing the metal component. The "Purchase Premium" is the premium added to each individual metal's spot ask price. This covers the dealer's cost of purchasing the metal in a fabricated form, delivery into the depository, commissions to traders/salesman, and profit margin for the dealer. The "Component per Ounce [oz] Sale Price [Px]" is the per ounce purchase price of each component metal to the investor. The "Unit Percent [%]" is the percent of the calculated ounce comprised of the specific metal. The "Composite Fraction Sale Price [Px]" is a calculation of the individual components sale price to the investor factoring in per ounce purchase price and actual metal volume contained within each ounce.

TABLE 1A

Calculate Bullion Complex per Oz price - Client Purchase
Precious Metals Composite Per Ounce Price - Client Purchase

| oz Complex Metal Component | Spot Ask Px per oz | Purchase Premium | Component per oz Sale PX | Unit % | Composite Fraction Sale PX |
|---|---|---|---|---|---|
| Au | 1,015.00 | 5.00% | 1,065.75 | 11.50% | 122.5613 |
| Ag | 17.83 | 6.50% | 18.99 | 87.00% | 16.5204 |
| Pt | 1,294.00 | 5.00% | 1,358.70 | 1.50% | 20.3805 |
| | 2,326.83 | | 2,443.44 | 100.00% | 159.4621 |

In Table 1A, the rolled up price per ounce to the investor is $159.4621. The per ounce ask price for the example precious metals composite ounce (purchase price) to the investor would be $159.4621. The $149.7515 per ounce bid price for the example precious metals composite ounce (sale price/buy-back) is calculated and shown in Table 1B below.

TABLE 1B

Calculate Bullion Complex per Oz price - Client Sale/Dealer Buy-Back
Calculate Bullion Complex Per OZ Client Sale/Dealer Buy Back Price

| oz Complex Metal Component | Spot Bid Price Peroz | Sale Discount | Component Per oz Buy PX | Unit % | PM Complex Per oz PX |
|---|---|---|---|---|---|
| Au | 1,015.00 | 1.25% | 1,002.313 | 11.50% | 115.2659 |
| Ag | 17.83 | 1.25% | 17.607 | 87.00% | 15.3182 |
| Pt | 1,294.00 | 1.25% | 1,277.825 | 1.50% | 19.1674 |
| | 2,326.83 | | 2,297.74 | 100.00% | 149.7515 |

The complex price per ounce of $149.7515 is the reported buy back price. Table 2 shows the dollar investment allocation per bullion complex ounce. The dollar percentage allocation to complex component is determined in accordance with the investor's priorities and goals.

TABLE 2

Investment $ Allocation per Bullion Complex Oz
Investment $ Allocation Per Bullion Complex OZ

| | Bullion Complex Per oz PX | $ Allocation to Complex Component | $ % Allocation to Complex Component | Metal oz's Owned per Complex oz |
|---|---|---|---|---|
| Au | 159.4621 | 122.5613 | 76.859% | 0.1150 |
| Ag | 159.4621 | 16.5204 | 10.360% | 0.8700 |
| Pt | 159.4621 | 20.3805 | 12.781% | 0.0150 |
| | | 159.4621 | 100.000% | 1.0000 |

The investor determines to invest $100,000.00. The investor's total bullion complex ounces purchased are thus 627.1081. Table 3 shows the client investment breakdown by total invested dollars.

TABLE 3

Client Investment Breakdown by Total Invested Dollars
Client Investment Breakdown - By Total Invested Dollars

| oz Complex Metal Component | Total PM Complex Oz's Purchased | Investment $ Allocation by Complex Metal | Client Owned oz's By Metal |
|---|---|---|---|
| Au | 627.1081 | 76,859.15 | 72.1174 |
| Ag | 627.1081 | 10,360.07 | 545.5841 |
| Pt | 627.1081 | 12,780.78 | 9.4066 |
| | | 100,000.00 | 627.1081 |

The different fields in the pricing process of the precious metals investment product of the present invention can be imported/exported real time to provide the investor a detail of the holding and a valuation of the holdings. Real-time export data related to the purchase and sale of the investment product can be made available to the dealer in order for the dealer to make the appropriate purchases and sales required to maintain an inventory sufficient to secure the investment positions of the clients. Again, additional metals can be added to different versions of a precious metals investment ounce of the present invention. The nature of the pricing process easily allows for the inclusion, or exclusion, of any metal and/or metals from various instances of a precious metals investment ounce of the present invention. Additionally, additional pricing and discount input fields can be included to account for other costs such as additional fees paid to third-party marketers, brokers, etc. This added flexibility allows for various dealers or brokers to offer the product to configure it in a way that is unique to their firm and supports their individual pricing schemes.

Figure 3:
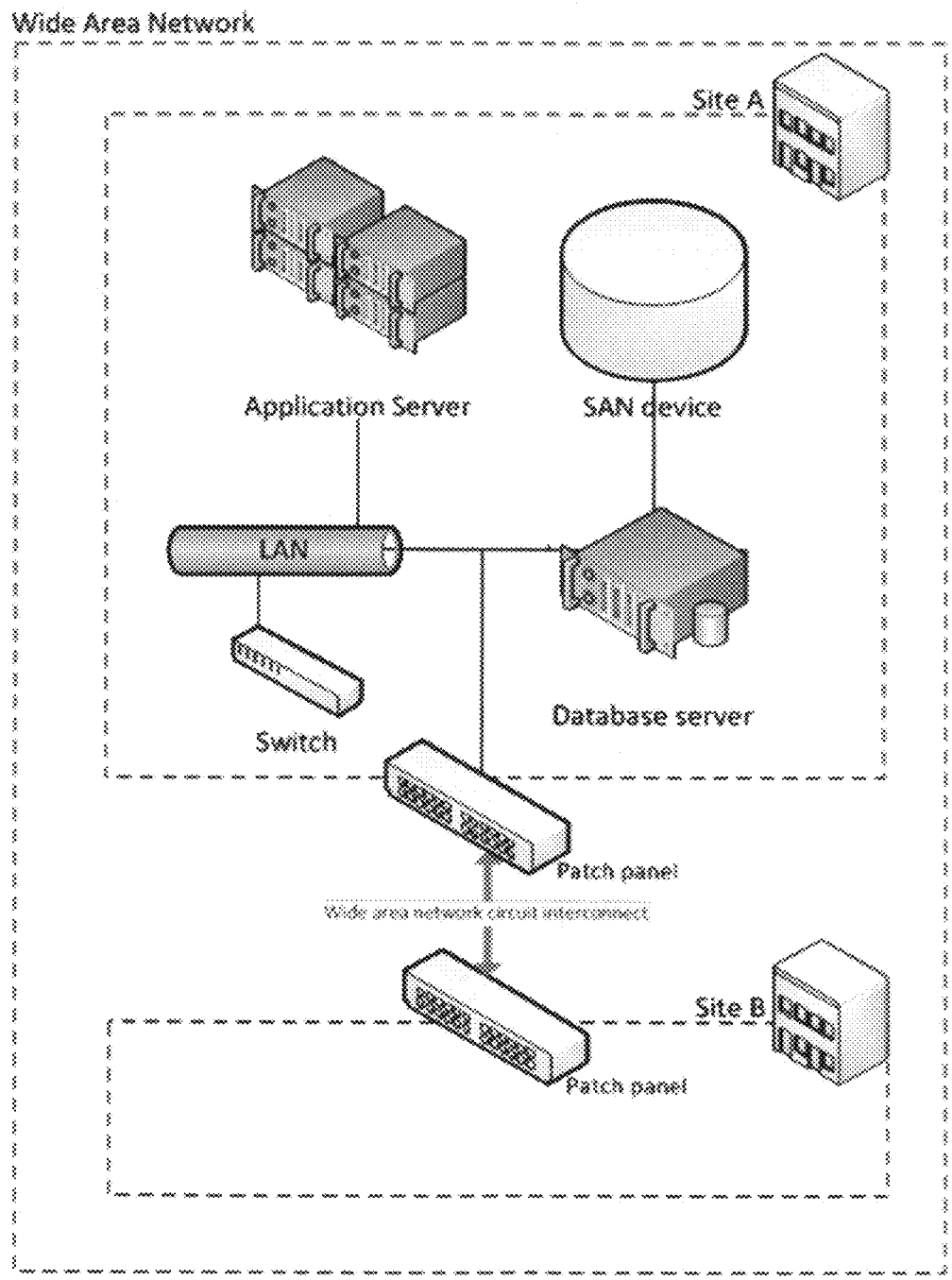
FIG. 3 is a non-limiting example of a hardware infrastructure that can be used to run a system that implements a precious metals investment product in accordance with the principles of the present invention.

Referring to FIG. 3, a non-limiting example of a high level hardware implementation can used to run a system of the present invention is seen. The infrastructure should include but not be limited to: wide area network connectivity, local area network connectivity, appropriate network switches and routers, electrical power (backup power), storage area network hardware, server-class computing hardware, and an operating system such as for example Redhat Linux Enterprise AS Operating System available from Red Hat, Inc, 1801 Varsity Drive, Raleigh, N.C.

The computer application for the investment product can be run as a stand-alone instance at a particular broker dealer or be offered to a dealer(s) as a software service offering (SaaS—Software as a Service). The SaaS offering model would house and run the application of the investment product at a remote data center facility separate from the operations of the broker dealer and provide the broker dealer web based access to the application.

The clearing and settling and administrative applications software server can run for example on an HP ProLiant DL 360 G6 server with multiple Intel Xeon 5600 series processors with a processor base frequency of 3.33 GHz, up to 192 GB of RAM, 2 PCIE expansion slots, 1 GB or 10 GB network controllers, hot plug SFF SATA drives, and redundant power supplies, available from Hewlett-Packard, Inc, located at 3000 Hanover Street, Palo Alto, Calif. The database server can be run for example on a HP ProLiant DL 380 G6 server with multiple Intel Xeon 5600 series processors with a processor base frequency of 3.33 GHZ, up to 192 GB of RAM, 6 PCIE expansion slots, 16 SFF SATA drive bays, an integrated P410i integrated storage controller, and redundant power supply, available from Hewlett-Packard.

As one example of an application for the computer implementation of a precious metals investment product in accordance with the present invention, real-time pricing for the components of the precious metals investment product are received from commodity exchanges performing price discovery via an electronic feed into the pricing application at the broker dealer or the SaaS instance at an ASP. The specific pricing offered by the individual broker dealer is determined utilizing the live price feed and the individual pricing variables as set by the broker dealer. Real-time pricing is pushed from the application to the client-facing broker or a web-based portal for direct client purchases. Client purchases a quantity of the precious metals investment product and receives a trade confirmation. At time of client order execution, the application is updated with the purchase details. Broker Dealers internal trading desk is notified in real time as to the client trade. From this data, the internal traders will either increase or decrease the aggregate holdings of precious metals. Detailed reporting of client holdings are an output of the application.

While the invention has been described with specific embodiments, other alternatives, modifications, and variations will be apparent to those skilled in the art. Accordingly, it will be intended to include all such alternatives, modifications and variations set forth within the spirit and scope of the appended claims.

What is claimed is:

1. A computer-implemented process for managing a precious metals investment product comprising:
memory storing a measured and fixed unit of trade comprising a plurality of fractional precious metal components, the precious metals components being backed by physical precious metals, at least two of the precious metals components comprising different precious metals, the fractional precious metal components weighted so as to achieve an investment objective whereby the investor seeks to deploy capital into the precious metals market;
quoting and trading the measured unit of trade as a single unit of trade, thus allowing for uniformity in the ongoing offers to buy and sell selected from the group consisting of a fixed quantity and multiples of this fixed quantity, and pricing consistency for the metals;
a processor in communication with the memory, the processor electronically tracking and real-time pricing the precious metals components in live market prices, the processor further determining and directing transfer of metals to and from metal storage facilities in correlation to trading of the unit of trade; and
the processor providing a communication to an investor with an option to take delivery of their precious metals; whereby the investor is provided correlated allocation and de-allocation of the corresponding metals associated with the purchase or sale of the metals.

2. The computer-implemented process for managing a precious metals investment product of claim 1 further wherein the measured unit of trade comprises a standard unit of measurement in the precious metals market.

3. The computer-implemented process for managing a precious metals investment product of claim 2 further wherein the standard unit of measurement comprises an ounce.

4. The computer-implemented process for managing a precious metals investment product of claim 1 further wherein the measured unit of trade comprises an even amount.

5. The computer-implemented process for managing a precious metals investment product of claim 4 further wherein the measured unit of trade further comprises a fractional amount.

6. The computer-implemented process for managing a precious metals investment product of claim 1 further wherein the precious metals components are selected from the group consisting of gold, silver, platinum, palladium, and combinations thereof.

7. The computer-implemented process for managing a precious metals investment product of claim 1 further wherein the investor further retains options to liquidate by selecting from the group consisting of selling the holdings at a buy back price and receiving funds from the sale; taking delivery of less than all of the metals owned; liquidating less than all of the metals owned for cash; and combinations thereof.

8. A computer-implemented process for pricing a precious metals composite product comprising:
establishing in memory a measured and fixed unit of trade comprising a plurality of fractional precious metal components, the precious metals components being backed by physical precious metals, at least two of the precious metals components comprising different precious metals, the fractional precious metal components weighted so as to achieve an investment objective whereby the investor seeks to deploy capital into the precious metals market;
a processor in communication with the memory, the processor quoting and trading the measured unit of trade as a single unit of trade, thus allowing for uniformity in the ongoing offers to buy and sell selected from the group a fixed quantity and multiples of this fixed quantity, and pricing consistency for the metals;
a processor in communication with the memory, the processor electronically tracking and real-time pricing the precious metals components in live prices, the processor further determining and directing transfer of metals to and from metal storage facilities in correlation to trading of the unit of trade; and
displaying live pricing of the precious metals composite product utilizing the live pricing of the precious metal components;
whereby an investor is provided correlated allocation and de-allocation of the corresponding metals associated with the purchase or sale of the metals.

9. The computer-implemented process for pricing a precious metals composite product of claim 8 further comprising quoting and trading a standard unit of measurement in the precious metals market.

10. The computer-implemented process for pricing a precious metals composite product of claim 9 further comprising quoting and trading an ounce.

11. The computer-implemented process for pricing a precious metals composite product of claim 8 comprising quoting and trading an even measured unit of trade.

12. The computer-implemented process for pricing a precious metals composite product of claim 11 further comprising quoting and trading a fractional standard unit of measurement.

13. The computer-implemented process for pricing a precious metals composite product of claim 8 further comprising selecting the precious metals components from the group consisting of gold, silver, platinum, palladium, and combinations thereof.

14. The computer-implemented process for pricing a precious metals composite product of claim 8 further comprising the investor liquidating by selecting from the group consisting of selling the holdings at the than quoted buy back price and receiving funds from the sale; take delivery of the metals owned; take delivery of less than all of the metals owned; liquidating less than all of the metals owned for cash; and combinations thereof.

* * * * *